(12) United States Patent
Krause (10) Patent No.: US 9,992,034 B2
(45) Date of Patent: Jun. 5, 2018

(54) COMPONENT MULTICAST PROTOCOL (71) Applicant: HEWLETT PACKARD ENTERPRISE DEVELOPMENT LP, Houston, TX (US)

(72) Inventor: Michael R. Krause, Boulder Creek, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 2 days.

(21) Appl. No.: 15/116,001

(22) PCT Filed: Mar. 13, 2014

(86) PCT No.: PCT/US2014/026327
§ 371 (c)(1),
(2) Date: Aug. 2, 2016

(87) PCT Pub. No.: WO2015/137954
PCT Pub. Date: Sep. 17, 2015

(65) Prior Publication Data
US 2017/0149579 A1    May 25, 2017

(51) Int. Cl.
*H04L 12/28*   (2006.01)
*H04L 12/18*   (2006.01)
*H04L 1/18*    (2006.01)

(52) U.S. Cl.
CPC ...... *H04L 12/1868* (2013.01); *H04L 12/1881* (2013.01); *H04L 1/18* (2013.01)

(58) Field of Classification Search
None
See application file for complete search history.

(56) References Cited

U.S. PATENT DOCUMENTS

| 5,860,080 | A | 1/1999 | James et al. |
| 6,310,875 | B1 | 10/2001 | Nichols et al. |
| 6,507,562 | B1 | 1/2003 | Kadansky et al. |
| 7,260,095 | B1 | 8/2007 | Naryaez |
| 7,346,699 | B1 * | 3/2008 | Krause .................. G06F 9/544 709/224 |
| 7,539,190 | B2 | 5/2009 | Stewart et al. |
| 2003/0165140 | A1 | 9/2003 | Tang et al. |
| 2003/0233594 | A1 * | 12/2003 | Earl .................. G06F 11/0709 714/4.11 |

(Continued)

OTHER PUBLICATIONS

PCI-SIG Engineering Change Notice; "ECN Multicast," May 8, 2008.

(Continued)

*Primary Examiner* — Michael J Moore, Jr.
(74) *Attorney, Agent, or Firm* — Hewlett Packard Enterprise Patent Department (57) ABSTRACT

A method includes transmitting, from a first component of an electronic device, a first transaction associated with a first sequence number to a second component of the electronic device based on a multicast protocol. The first transaction is independent of an Internet protocol. The method also includes receiving an acknowledgement message that corresponds to a positive acknowledgment message or a negative acknowledgement message. The method further includes in response to receiving the negative acknowledgement message, retransmitting the first transaction to the second component using the first sequence number based on the multicast protocol.

19 Claims, 4 Drawing Sheets

(56) References Cited

U.S. PATENT DOCUMENTS

| | | | |
|---|---|---|---|
| 2004/0160975 | A1 | 8/2004 | Frank et al. |
| 2008/0276249 | A1* | 11/2008 | Dynarski ............. H04L 12/189 719/313 |
| 2008/0320171 | A1 | 12/2008 | Walsh et al. |
| 2011/0159799 | A1* | 6/2011 | Chen ..................... H04L 1/1867 455/3.01 |
| 2012/0297265 | A1 | 11/2012 | Weinman et al. |
| 2013/0266009 | A1 | 10/2013 | Colloff et al. |
| 2014/0036915 | A1* | 2/2014 | Dholakia ............. H04L 45/586 370/390 |

OTHER PUBLICATIONS

International Searching Authority, the International Search Report and the Written Opinion, dated Nov. 28, 2014, 15 Pages.

Jack Regula, "Multicast PCI Express," 2008, PCI-SIG Developers Conference.

K.H. Kim, "A Scheme for Reliable Real-Time Messaging with Bounded Delays," 2010, 13th IEEE International Symposium on Object/Component/Service-Oriented Real-Time Distributed Computing.

Jing Qian, "Real-time Multicast and Memory Replication Channels with Delay Bounded Error Detection and Retry Capabilities," Mar. 28-31, 2011, 14th IEEE International Symposium on Object/Component/Service-Oriented Real-Time Distributed Computing, <http://ieeexpiore.ieee.org/stamp/stamp.jsp?arnumber=5753590 > on pp. 40-49.

* cited by examiner

FIG. 4

COMPONENT MULTICAST PROTOCOL

BACKGROUND

A number of different protocols exist for transmitting data from a sender to a receiver. For example, user datagram protocol (UDP) is a protocol for transmitting data over a network without prior message exchanges to set up a transmission channel. As another example, a unicast protocol is a protocol for transmitting data to a single receiver identified by a distinct address.

BRIEF DESCRIPTION OF THE DRAWINGS

Some examples of the present application are described with respect to the following figures.

DETAILED DESCRIPTION

As described above, a number of different protocols exists for transmitting data from a sender to a receiver. In certain cases, the sender may transmit data to multiple receivers simultaneously. For example, a component of an electronic device may transmit data to multiple components of the electronic device simultaneously. When a sender is to transmit data to multiple receivers simultaneously, an efficiency of the transmissions may be increased by using a multicast protocol. A multicast protocol is a protocol for transmitting data from a sender to a set of receivers simultaneously. However, some multicast protocols are implemented for data transmissions involving the Internet protocol, such as transmissions of packets via a network. Thus, an efficiency of data transmissions from a sender to multiple receivers may be reduced when the data transmissions are independent of the Internet protocol, such as data transmission from a processor to storage devices.

Examples described herein address the above challenges by providing a multicast protocol that can be used to transmit data from a component of an electronic device to other components of the electronic device. For example, a first component of an electronic device may transmit a multicast transaction to a group of components that are in a multicast group. In response to receiving the multicast transaction without errors, a component in the multicast group may transmit with a positive acknowledgement (PACK) message to the first component. In response to receiving the multicast transaction with an error, a component in the multicast group may transmit a distinct negative acknowledgement (NACK) message to the first component. In response to receiving a NACK message, the first component may retransmit the multicast transaction to a component in the multicast group based on a sequence number of the multicast transaction.

Each multicast transaction may include a sequence number, an operation code (OpCode) field, and a tag field. A value of the OpCode field may direct a component in the multicast group to perform a unidirectional operation or a bidirectional operation. When a value of the OpCode field directs a component in the multicast group to perform a bidirectional operation, a value of the tag field correlates a response generated by the component to the bidirectional operation. In this manner, examples described herein may increase transmission efficiency among components of an electronic device.

Figure 1:
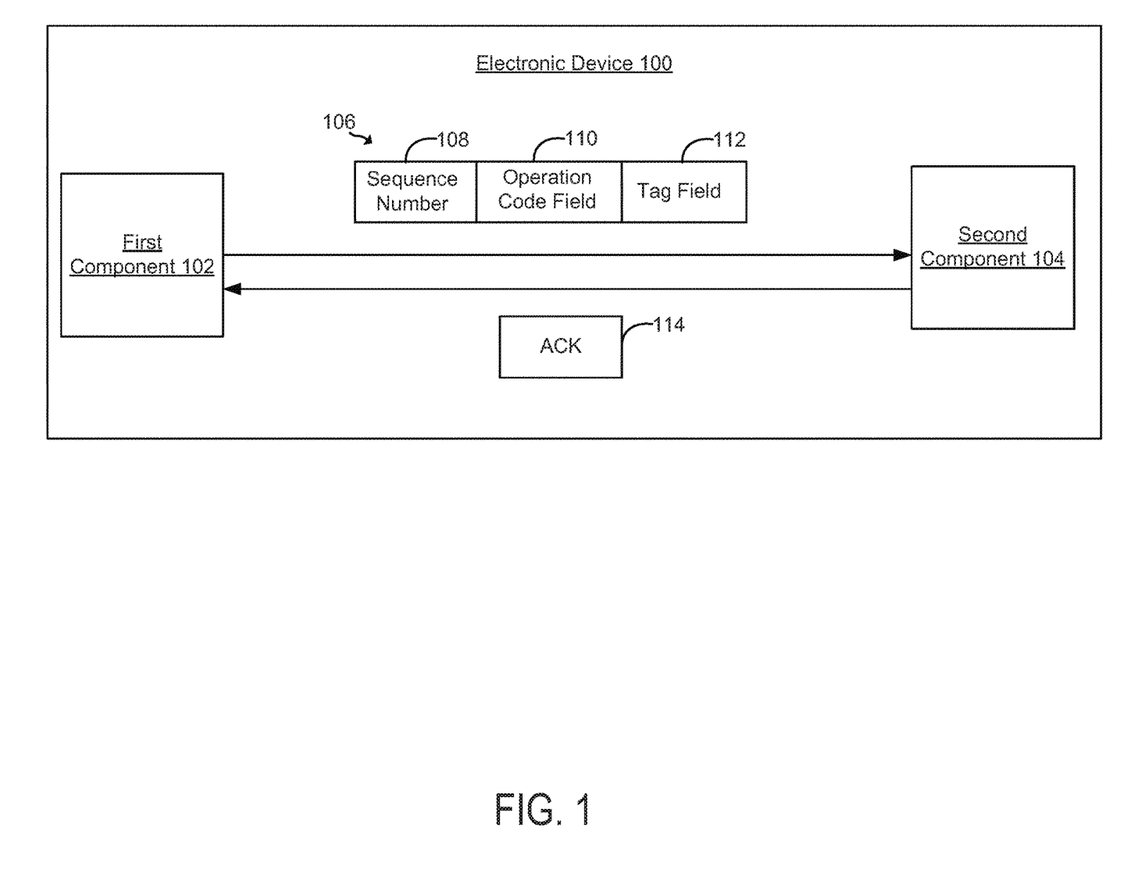
FIG. 1 is a block diagram of an example electronic device that includes a first component transmitting data to a second component via a multicast protocol.

Referring now to the figures, FIG. 1 is a block diagram of an example electronic device 100 that includes a first component transmitting data to a second component via a multicast protocol. Electronic device 100 may be, for example, a memory device, a notebook computer, a desktop computer, a server computer, a tablet computing device, a network switch, a router, a mobile phone, or any other device including components suitable to communicate via a multicast protocol.

Electronic device 100 may include a first component 102 and a second component 104. First component 102 may be connected to second component 104 via a physical connection, such as a metal trace, a cable, etc. Components 102 and 104 may be each an electronic component, a processor, a memory, an input/output (I/O) component, a network switch, a router, a multicast capable fabric-attached device, or any multicast capable device that is suitable to communicate with another multicast capable device independent of the Internet protocol.

During operation, first component 102 may transmit a multicast transaction 106 to second component 104 based on a multicast protocol. First component 102 may transmit multicast transaction 106 to members of a multicast group that includes components 102-104. Each component of electronic device 100 may be members of multiple multicast groups. For example, second component 104 may be a member of a first multicast group and a member of a second multicast group. First component 102 may be a member of the first multicast group and a member of a third multicast group.

Multicast transaction 106 may be any data transmission that is independent of the Internet protocol. As used herein, a data transmission that is independent of the Internet protocol may be any data transmission that is transmitted without the use of the Internet protocol. For example, a data transmission may be independent of the Internet protocol when the data transmission is transmitted without using an Internet protocol address. In some examples, multicast transaction 106 may correspond to a write request. In some examples, multicast transaction 106 may correspond to a read request.

Multicast transaction 106 may include a sequence number 108, an operation code (OpCode) field 110, and a tag field 112. Sequence number 108 may be used to identify multicast transaction 106. A value of OpCode field 110 may direct second component 104 to perform an operation, such as a unidirectional operation or a bidirectional operation. For example, a value 0 in the OpCode field 110 may indicate a unidirectional operation. A value 1 in the OpCode field 110 may indicate a bidirectional operation.

A unidirectional operation may be an operation without a response. For example, a unidirectional operation may be a write operation between first component 102 to second component 104. First component 102 may a write request to second component 104. Second component 104 may write or store data to second component 104 based on the write request. Second component 104 may not transmit a response based on the write request. A bidirectional operation may be an operation with a response. For example, a bidirectional operation may be a read operation between first component 102 and second component 104. First component 102 may transmit a read request to second component 104. Second component 104 may transmit a response, such as data requested by first component 102, to first component 102 based on the read request.

When the value in the OpCode field 110 indicates a bidirectional operation, a value in the tag field 112 may correlate a response generated by second component 104 to the bidirectional operation. For example, when the value in the OpCode field 110 indicates a read request, in response to receiving the read request, second component 104 may obtain data using the read request. Second component 104 may transmit the data to first component 102 as a response to the read request. Second component 104 may include the value in the tag field 112 in the response. Thus, first component 102 may correlate the response with the read request based on the value in the tag field 112. When the value in the OpCode field 110 indicates a unidirectional operation, the value in the tag field 112 may be ignored by second component 104 since no response is to be generated. Thus, the value of in the tag field 112 may be independent of the unidirectional operation. In some examples, when multiple components are responding to a multicast transaction, each responding component may include a source switch identifier (SSID) in a response. The SSIDs may be used by a transmitting component to determine how data in each response is placed.

In response to receiving multicast transaction 106, second component 104 may transmit an acknowledgement (ACK) message 114 based on the multicast protocol. ACK message 114 may include sequence number 108. When second component 104 receives multicast transaction 106 without an error, ACK message 114 may correspond to a PACK message. A PACK message may indicate the last valid multicast transaction received within a specific ordering domain at the time the PACK message is scheduled for transmission. In some examples, a PACK message may be cumulative. For example, a PACK message may acknowledge all outstanding valid multicast transactions up to and including the multicast transaction indicated by a sequence number, such as sequence number 108.

A PACK message may be transmitted as a standalone transaction. In some examples, first component 102 may drop or ignore duplicate PACK messages from second component 104. When a PACK is received, first component 102 as a transmitter of multicast transaction 106 may update a multicast transaction tracking structure (MTTS), such as a table or a database, to reflect which component has received the associated multicast transaction. Thus, reliability of transmission of multicast transactions may be tracked by a transmitter (e.g., first component 102).

When second component 104 receives multicast transaction 106 with an error, ACK message 114 may correspond to a NACK message. For example, when second component 104 receives a corrupted copy of multicast transaction 106, second component 104 may transmit a NACK message to first component 102. A NACK message may indicate that an error has been detected, such as a missing or corrupt multicast transaction, at the time the NACK message is scheduled for transmission.

In some examples, a NACK message may be cumulative. For example, a NACK message may acknowledge all outstanding multicast transactions up to and including a multicast transaction indicated by a sequence number, such as sequence number 108. A NACK message may be transmitted as a standalone transaction. In some examples, a NACK message may include an error code that indicates a detected error associated with a multicast transaction.

In response to receiving a NACK message from second component 104, first component 102 may identify multicast transaction 106 as a multicast transaction for retransmission based on sequence number 108 in the NACK message. Thus, first component 102 may retransmit multicast transaction 106 to second component 104 in response to receiving the NACK message.

Sequence numbers, such as sequence number 108, may be used to detect missing, duplicate, or out-of-order multicast transactions. Each sequence number may be associated with a particular multicast sequence number space. Each multicast sequence number space may be associated with a single multicast ordering domain. Each sequence number may be associated with a single multicast transaction. In some examples, when a PACK message associated with a multicast transaction having a particular sequence number, the particular sequence number may be released and may be reused for subsequent multicast transactions. In some examples, when no sequence numbers are available, communication within an impacted multicast ordering domain may be paused until outstanding multicast transactions are successfully acknowledged and the associated sequence numbers are released for reuse. When a multicast ordering domain is initialized, the first end-to-end transaction transmitted by a transmitter may set the sequence number to one.

In some examples, a transmitter, such as first component 102, may maintain a retransmission timer per multicast ordering domain to address unacknowledged multicast transmissions. A retransmission timer may measure the time since the last multicast transaction is acknowledged by all receivers, such as second component 104. A transmitter may also maintain a list of outstanding multicast transactions (i.e., multicast transactions that are unacknowledged). Upon expiration of the retransmission timer, a transmitter may retransmit the first multicast transaction in the outstanding multicast transactions list or all outstanding multicast transactions in the outstanding multicast transactions list.

In some examples, upon expiration of the retransmission timer, in addition to retransmitting at least one outstanding multicast transaction, a transmitter may decrement a retry counter by one. When the retry counter has a value of zero, a transmitter may transmit an error message to a multicast manager so that corrective actions, such as multicast group reconfiguration, may be taken. In some examples, a transmitter may restart the retransmission timer when all receivers have acknowledged an outstanding a multicast transaction via PACK messages or NACK messages and the outstanding multicast transactions list is not empty. A transmitter may stop the retransmission timer when the outstanding multicast transactions list is empty. Thus, by utilizing sequence numbers in multicast transactions, ACK messages, and multicast transaction retransmission, components of electronic device 100 may implement a reliable multicast protocol.

Figure 2:
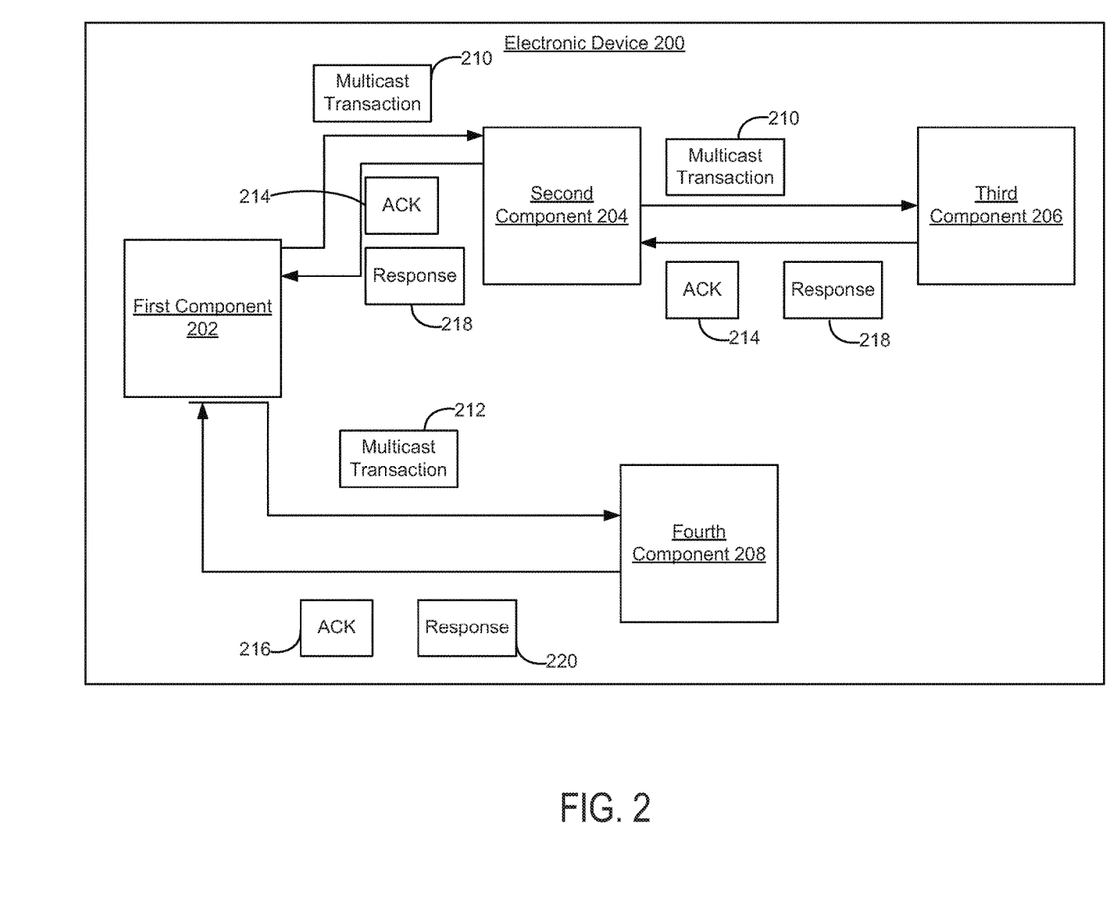
FIG. 2 is a block diagram of an example electronic device that includes a first component transmitting data to a second component via a multicast protocol.

FIG. 2 is a block diagram of an example electronic device 200 that includes a first component transmitting data to a second component via a multicast protocol. Electronic device 200 may be similar to electronic device 100 of FIG. 1. Electronic device 200 may include a first component 202, a second component 204, a third component 206, and a fourth component 208. Components 202-208 may be similar to components 102-104 of FIG. 1. Components 202-208 may be connected via physical connections, such as metal traces, cables, etc. For example, first component 202 may be connected to second component 204 and to fourth component 208. Second component 204 may be connected to third component 206.

During operation, first component 202, third component 206, and fourth component 208 may be members of a multicast group. Second component 204 may be a multicast capable switch that relays a multicast transaction to first component 202 or to third component 206. First component 202 may transmit a multicast transaction 210 to third component 206 and a multicast transaction 212 to fourth component 208 simultaneously based on a multicast protocol. Multicast transactions 210-212 may be similar to multicast transaction 106.

Second component 204 may receive multicast transaction 210 and relay multicast transaction 210 to third component 206 as first component 202 is not directly connected to third component 206. Second component 204 may determine how to relay multicast transaction 210 based on a multicast relay table. The multicast relay table may indicate multicast group membership of each component connected to second component 204 so that second component 204 may relay a multicast transaction to a member of a particular multicast group.

In response to receiving multicast transaction 210, third component 206 may transmit an ACK message 214 to first component 202 via second component 204. Second component 204 may relay ACK message 214 to first component 202. In response to receiving multicast transaction 212, fourth component 208 may transmit an ACK message 216 to first component 202. ACK messages 214-216 may be a PACK message or a NACK message. In some examples, multicast transactions 210-212 may correspond to a bidirectional operation. Thus, third component 206 may transmit a response 218 associated with the bidirectional operation to first component 202 and fourth component 208 may transmit a response 220 associated with the bidirectional operation to first component 202. For example, the bidirectional operation may be a read request and responses 218-220 may correspond to data retrieved based on the read request. Second component 204 may relay response 218 to first component 202.

Figure 3:
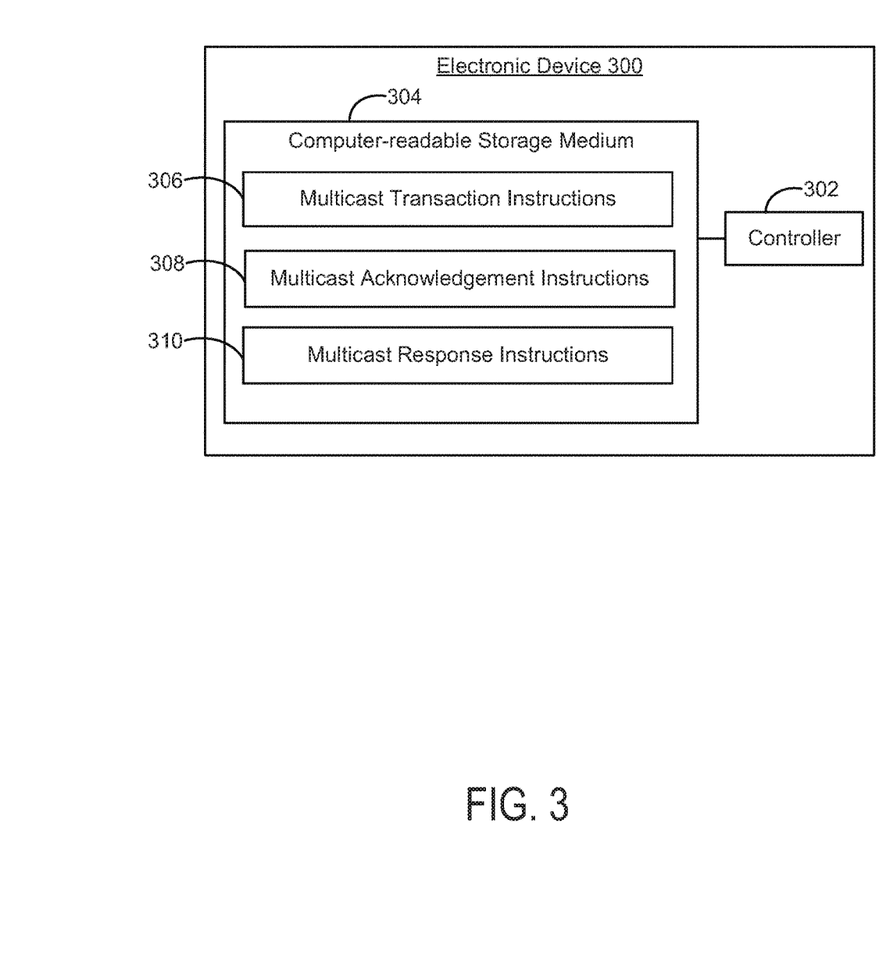
FIG. 3 is a block diagram of an example electronic device that includes a first component transmitting data to a second component via a multicast protocol.

FIG. 3 is a block diagram of an example electronic device 300 that includes a first component transmitting data to a second component via a multicast protocol. Electronic device 300 may be similar to electronic device 100 of FIG. 1 or electronic device 200 of FIG. 2. Electronic device 300 may include a controller 302 and a computer-readable storage medium 304.

Controller 302 may be a central processing unit (CPU), a semiconductor-based microprocessor, and/or other hardware devices suitable for retrieval and execution of instructions stored in computer-readable storage medium 304. Controller 302 may fetch, decode, and execute instructions 306-310 to implement a component multicast protocol. As an alternative or in addition to retrieving and executing instructions, controller 302 may include at least one electronic circuit that includes electronic components for performing the functionality of instructions 306, 308, 310, or a combination thereof.

Computer-readable storage medium 304 may be any electronic, magnetic, optical, or other physical storage device that contains or stores executable instructions. Thus, computer-readable storage medium 304 may be, for example, Random Access Memory (RAM), an Electrically Erasable Programmable Read-Only Memory (EEPROM), a storage device, an optical disc, etc. In some examples, computer-readable storage medium 304 may be a non-transitory storage medium, where the term "non-transitory" does not encompass transitory propagating signals. As described in detail below, computer-readable storage medium 304 may be encoded with a series of processor executable instructions 306-310 for transmitting and retransmitting multicast transactions, acknowledging multicast transactions, and responding to multicast transactions.

Multicast transaction instructions 306 may transmit a multicast transaction to members of a multicast group. Multicast transaction instructions 306 may also perform multicast group management, such as adding members to a multicast group, create a multicast group, delete a multicast group, etc. Multicast transaction instructions 306 may also retransmit multicast transactions in response to a NACK message or upon expiration of a retransmission timer.

Multicast acknowledgement instructions 308 may transmit an ACK message to acknowledge a multicast transaction. The ACK message may be a PACK message or a NACK message. Multicast response instructions 310 may transmit a response to a multicast transaction. For example, when a multicast transaction corresponds to a bidirectional operation, multicast response instructions 310 may transmit a response to the bidirectional operation.

Figure 4:
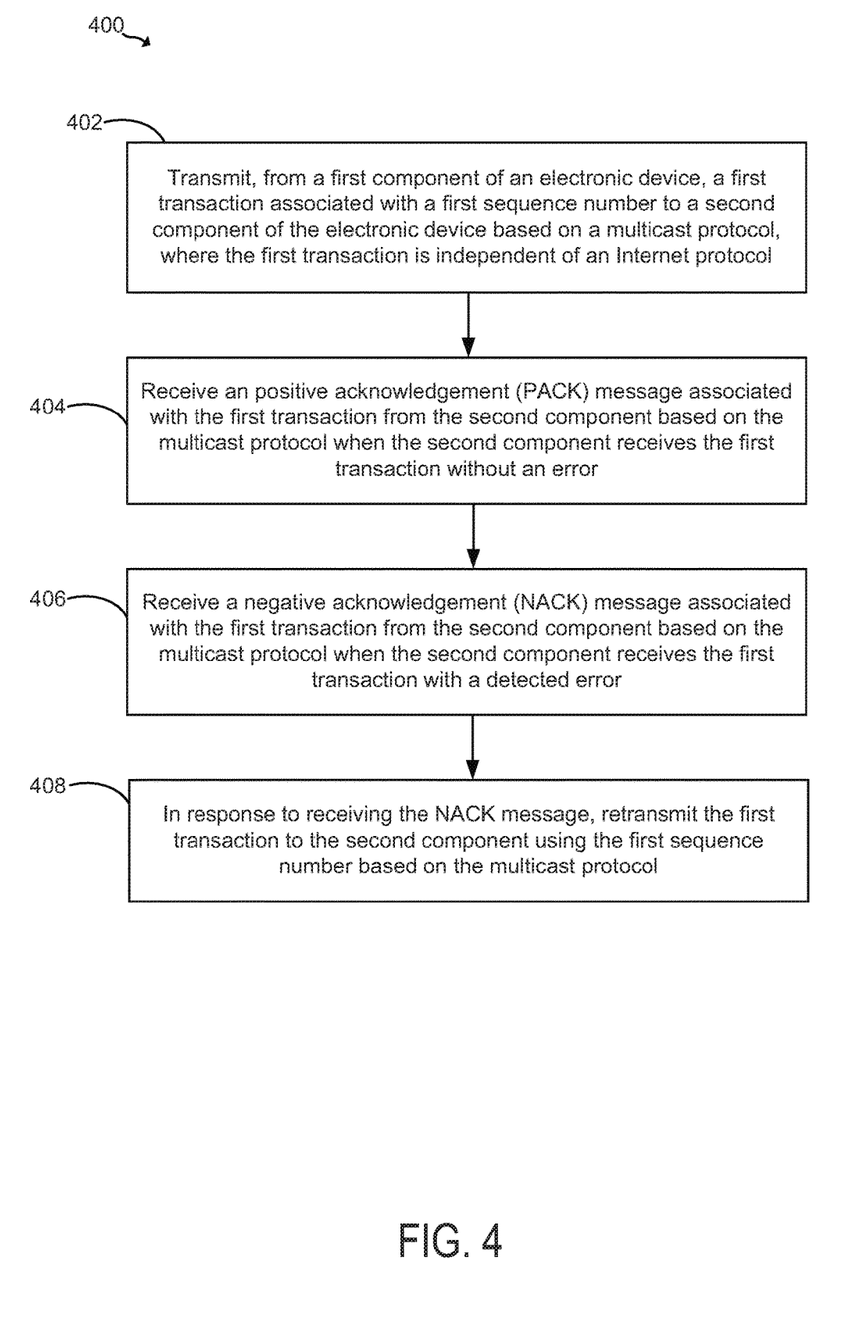
FIG. 4 is a flowchart illustrating an example method of a first component transmitting data to a second component via a multicast protocol.

FIG. 4 is a flowchart illustrating an example method 400 of a first component transmitting data to a second component via a multicast protocol. Method 400 includes transmitting, from a first component of an electronic device, a first transaction associated with a first sequence number to a second component of the electronic device based on a multicast protocol, where the first transaction is independent of an Internet protocol, at 402. For example, referring to FIG. 1, first component 102 may transmit a multicast transaction 106 to second component 104 based on a multicast protocol. Multicast transaction 106 may include a sequence number 108, an operation code (OpCode) field 110, and a tag field 112.

Method 400 also includes receiving an positive acknowledge (PACK) message associated with the first transaction from the second component based on the multicast protocol when the second component receives the first transaction without an error, at 404. For example, referring to FIG. 1, when second component 104 receives multicast transaction 106 without an error, ACK message 114 may correspond to a PACK message.

Method 400 further includes receiving a negative acknowledge (NACK) message associated with the first transaction from the second component based on the multicast protocol when the second component receives the first transaction with a detected error, at 406. For example, referring to FIG. 1, when second component 104 receives multicast transaction 106 with an error, ACK message 114 may correspond to a NACK message.

Method 400 further includes in response to receiving the NACK message, retransmitting the first transaction to the second component using the first sequence number based on the multicast protocol, at 408. For example, referring to FIG. 1, in response to receiving a NACK message from second component 104, first component 102 may identify multicast transaction 106 as a multicast transaction for retransmission based on sequence number 108 in the NACK message. Thus, first component 102 may retransmit multicast transaction 106 to second component 104 in response to receiving the NACK message.

The use of "comprising", "including" or "having" are synonymous and variations thereof herein are meant to be inclusive or open-ended and do not exclude additional unrecited elements or method steps.

What is claimed is:

1. A method comprising:
transmitting, from a first component of an electronic device, a first transaction associated with a first sequence number to a second component of the electronic device based on a multicast protocol, wherein the first transaction is independent of an Internet protocol and includes an operation code (OpCode) field and a tag field, wherein when a value of the OpCode field directs the second component to perform a bidirectional operation, a value of the tag field correlates a response generated by the second component to the bidirectional operation, and wherein when the value of the OpCode field directs the second component to perform a unidirectional operation, the value of the tag field is independent of the unidirectional operation;
receiving an positive acknowledgement (PACK) message associated with the first transaction from the second component based on the multicast protocol when the second component receives the first transaction without an error;
receiving a negative acknowledgement (NACK) message associated with the first transaction from the second component based on the multicast protocol when the second component receives the first transaction with a detected error; and
in response to receiving the NACK message, retransmitting the first transaction to the second component using the first sequence number based on the multicast protocol.

2. The method of claim 1, wherein the unidirectional operation corresponds to a write request, and wherein the bidirectional operation corresponds to a read request.

3. The method of claim 1, wherein the first component includes a processor, a memory, an input/output (I/O) component, a network switch, or a router.

4. The method of claim 1, further comprising determining a placement of data in multiple responses based on source switch identifiers (SSIDs) of multiple responding components.

5. The method of claim 1, further comprising:
releasing the first sequence number for use with a subsequent transaction in response to receiving the PACK message; and
retransmitting the first transaction in response to an expiration of a retransmission timer.

6. The method of claim 1, wherein the NACK message includes an error code associated with the detected error.

7. An electronic device comprising:
a transmitter; and
a receiver connected to the transmitter, the transmitter to:
transmit a first transaction associated with a first sequence number to the receiver of the electronic device based on a multicast protocol, wherein the first transaction is independent of an Internet protocol, wherein the first transaction includes an operation code (OpCode) field and a tag field, and wherein when a value of the OpCode field directs the receiver to perform a bidirectional operation, a value of the tag field correlates a response generated by the receiver to the bidirectional operation, and wherein when the value of the OpCode field directs the receiver to perform a unidirectional operation, the value of the tag field is independent of the unidirectional operation;
receive a positive acknowledgement (PACK) message associated with the first transaction from the receiver based on the multicast protocol when the receiver receives the first transaction without an error;
receive a negative acknowledgement (NACK) message associated with the first transaction from the receiver based on the multicast protocol when the receiver receives the first transaction with a detected error, and wherein the NACK message includes an error code associated with the detected error; and
in response to receiving the NACK message, retransmit the first transaction to the receiver using the first sequence number based on the multicast protocol.

8. The electronic device of claim 7, wherein the retransmission of the first transaction to the receiver is different from the PACK message and the NACK message.

9. The electronic device of claim 7, wherein when a value of the OpCode field to direct the second electronic component to perform a bidirectional operation, a value of the tag field correlates a response generated by the second electronic component to the bidirectional operation, wherein when the value of the OpCode field to direct the second electronic component to perform a unidirectional operation, the value of the tag field is independent of the unidirectional operation, wherein the unidirectional operation corresponds to a write request, and wherein the bidirectional operation corresponds to a read request.

10. The electronic device of claim 7, wherein the transmitter includes a processor, a memory, an input/output (I/O) component, a network switch, or a router.

11. The electronic device of claim 7, the transmitter further to:
release the first sequence number for use with a subsequent transaction in response to receiving the PACK message; and
retransmit the first transaction in response to an expiration of a retransmission timer.

12. A non-transitory computer-readable storage medium comprising instructions that when executed cause a controller of an electronic device to:
transmit, from a first component of the electronic device, a first transaction associated with a first sequence number to a second component of the electronic device based on a multicast protocol, wherein the first transaction is independent of an Internet protocol and includes an operation code (OpCode) field and a tag field, wherein when a value of the OpCode field directs the second component to perform a bidirectional operation, a value of the tag field correlates a response generated by the second component to the bidirectional operation, and wherein when the value of the OpCode field directs the second component to perform a unidirectional operation, the value of the tag field is independent of the unidirectional operation;
receive a positive acknowledgement (PACK) message associated with the first transaction from the second component based on the multicast protocol when the second component receives the first transaction without an error;
receive a negative acknowledgement (NACK) message associated with the first transaction from the second component based on the multicast protocol when the second component receives the first transaction with a detected error; and
in response to receiving the NACK message, retransmit the first transaction to the second component using the first sequence number based on the multicast protocol, wherein the retransmission of the first transaction to the second component is different from the PACK message and the NACK message.

13. The non-transitory computer-readable storage medium of claim 12, wherein the first transaction includes an operation code (OpCode) field and a tag field, wherein when a value of the OpCode field directs the second component to perform a bidirectional operation, a value of the tag field correlates a response generated by the second component to the bidirectional operation, wherein when the value of the OpCode field directs the second component to perform a unidirectional operation, the value of the tag field is independent of the unidirectional operation, wherein the unidirectional operation corresponds to a write request, and wherein the bidirectional operation corresponds to a read request.

14. The non-transitory computer-readable storage medium of claim 12, wherein the instructions when executed further cause the controller of the electronic device to:
  release the first sequence number for use with a subsequent transaction in response to receiving the PACK message; and
  retransmit the first transaction in response to an expiration of a retransmission timer.

15. The non-transitory computer readable storage medium of claim 12, wherein the NACK message includes an acknowledgment of outstanding multicast transactions indicated by the first sequence number.

16. The electronic device of claim 7, wherein the NACK message includes an acknowledgement of outstanding multicast transactions indicated by the first sequence number.

17. The non-transitory computer readable storage medium of claim 12, wherein the NACK message is transmitted as a standalone transaction.

18. The non-transitory computer readable storage medium of claim 12, wherein the NACK message includes an error code associated with the detected error.

19. The non-transitory computer readable storage medium of claim 12, wherein the transmitter includes a processor, a memory, an input/output (I/O) component, a network switch, or a router.

* * * * *